United States Patent [19]
Poston

[11] Patent Number: 6,161,333
[45] Date of Patent: Dec. 19, 2000

[54] FLOWER POT SYSTEM

[76] Inventor: Rebecca Ann Poston, 2451 Crabtree Church Rd., Molino, Fla. 32577

[21] Appl. No.: 09/243,519

[22] Filed: Feb. 1, 1999

[51] Int. Cl.[7] ........................................... A01G 9/02
[52] U.S. Cl. ..................................................... 47/86
[58] Field of Search .................... 47/66.1, 66.5, 47/66.6, 87; D11/143

[56] References Cited

U.S. PATENT DOCUMENTS

| | | | |
|---|---|---|---|
| D. 405,027 | 2/1999 | McElwain et al. | D11/152 |
| D. 416,214 | 11/1999 | Conner | D11/143 |
| 585,486 | 6/1897 | Show . | |
| 1,419,152 | 6/1922 | Lansing . | |
| 4,020,592 | 5/1977 | Saunders | 47/71 |
| 4,597,221 | 7/1986 | Adair et al. | 47/66 |
| 4,715,144 | 12/1987 | Lee | 47/66 |
| 4,821,454 | 4/1989 | Wilds | 47/41 R |
| 5,960,587 | 10/1999 | Brasseur, Jr. et al. | 47/86 |

*Primary Examiner*—Peter M. Poon
*Assistant Examiner*—Francis T Palo
*Attorney, Agent, or Firm*—Joseph N. Breaux

[57] ABSTRACT

A flower pot system for use on a patio table having an umbrella pole projecting upwardly form the center thereof. The flower pot system provides two flower pot members that together form a tubular passageway through which an umbrella pole is positionable. The two flower pot members are easily installable and removable from around an umbrella pole without lifting the umbrella pole from the patio table. A pair of drip trays are provided to hold the two flower pot members together and to provide a fluid pathway between the two flower pot members.

1 Claim, 4 Drawing Sheets

FLOWER POT SYSTEM

TECHNICAL FIELD

The present invention relates to flower pots and more particularly to a flower pot system that is adapted to surround an umbrella pole or the like; the flower pot system including two half-cylinder pot members and two drip trays; each half-cylinder pot member including a curved wall, a planar wall, an umbrella pole channel formed into a mid-portion of the planar wall and oriented from the pot bottom to the pot top and a drip tray edge passage channel formed into the pot bottom and in connection between the umbrella pole channel and an exterior surface of the curved wall, the drip tray edge passage channel being oriented perpendicular to the umbrella pole channel, the pot bottom having a number of drain holes formed therethrough on either side of the drip tray passage channel; each drip tray being half-circular in shape and having a planar contact edge, a curved perimeter edge, and a drip tray umbrella channel formed into a mid portion of the planar contact edge and extending from a tray bottom to a tray top; the drip tray umbrella channel, the planar contact edge and the curved perimeter edge being sized and oriented such that when one half of the planar contact edge is positioned through the drip tray edge passage channel the drip tray umbrella channel is concentrically aligned with the umbrella pole channel and one half of the curved perimeter edge is adjacent to one-half of the curved wall.

BACKGROUND ART

Patio tables with umbrellas provide a pleasant spot to relax, read and converse with friends. However, the upwardly projecting umbrella pole can make it difficult to provide a floral centerpiece on the patio table. It would be a benefit, therefore, to have a flower pot system that included a passageway through which the umbrella pole could pass. Because many plants require repotting and other maintenance that is more easily performed at a work bench, it would be a further benefit to have a flower pot system that could be installed and removed from around an umbrella pole without lifting the umbrella pole from the patio table.

GENERAL SUMMARY DISCUSSION OF INVENTION

It is thus an object of the invention to provide a flower pot system that includes a passageway through which an umbrella pole is positionable.

It is a further object of the invention to provide a flower pot system that is installable and removable from around an umbrella pole without lifting the umbrella pole from the patio table.

It is a still further object of the invention to provide a flower pot system that includes two half-cylinder pot members and two drip trays; each half-cylinder pot member including a curved wall, a planar wall an umbrella pole channel formed into a mid-portion of the planar wall and oriented from the pot bottom to the pot top and a drip tray edge passage channel formed into the pot bottom and in connection between the umbrella pole channel and an exterior surface of the curved wall, the drip tray edge passage channel being oriented perpendicular to the umbrella pole channel, the pot bottom having a number of drain holes formed therethrough on either side of the drip tray passage channel; each drip tray being half-circular in shape and having a planar contact edge, a curved perimeter edge, and a drip tray umbrella channel formed into a mid portion of the planar contact edge and extending from a tray bottom to a tray top; the drip tray umbrella channel, the planar contact edge and the curved perimeter edge being sized and oriented such that when one half of the planar contact edge is positioned through the drip tray edge passage channel the drip tray umbrella channel is concentrically aligned with the umbrella pole channel and one half of the curved perimeter edge is adjacent to one-half of the curved wall. It is a still further object of the invention to provide a flower pot system that accomplishes all or some of the above objects in combination.

Accordingly, a flower pot system is provided. The flower pot system includes two half-cylinder pot members and two drip trays; each half-cylinder pot member including a curved wall, a planar wall, an umbrella pole channel formed into a mid-portion of the planar wall and oriented from the pot bottom to the pot top and a drip tray edge passage channel formed into the pot bottom and in connection between the umbrella pole channel and an exterior surface of the curved wall, the drip tray edge passage channel being oriented perpendicular to the umbrella pole channel, the pot bottom having a number of drain holes formed therethrough on either side of the drip tray passage channel; each drip tray being half-circular in shape and having a planar contact edge, a curved perimeter edge, and a drip tray umbrella channel formed into a mid portion of the planar contact edge and extending from a tray bottom to a tray top; the drip tray umbrella channel, the planar contact edge and the curved perimeter edge being sized and oriented such that when one half of the planar contact edge is positioned through the drip tray edge passage channel the drip tray umbrella channel is concentrically aligned with the umbrella pole channel and one half of the curved perimeter edge is adjacent to one-half of the curved wall.

BRIEF DESCRIPTION OF DRAWINGS

For a further understanding of the nature and objects of the present invention, reference should be made to the following detailed description, taken in conjunction with the accompanying drawings, in which Like elements are given the same or analogous reference numbers and wherein.

EXEMPLARY MODE FOR CARRYING OUT THE INVENTION

Figure 1:
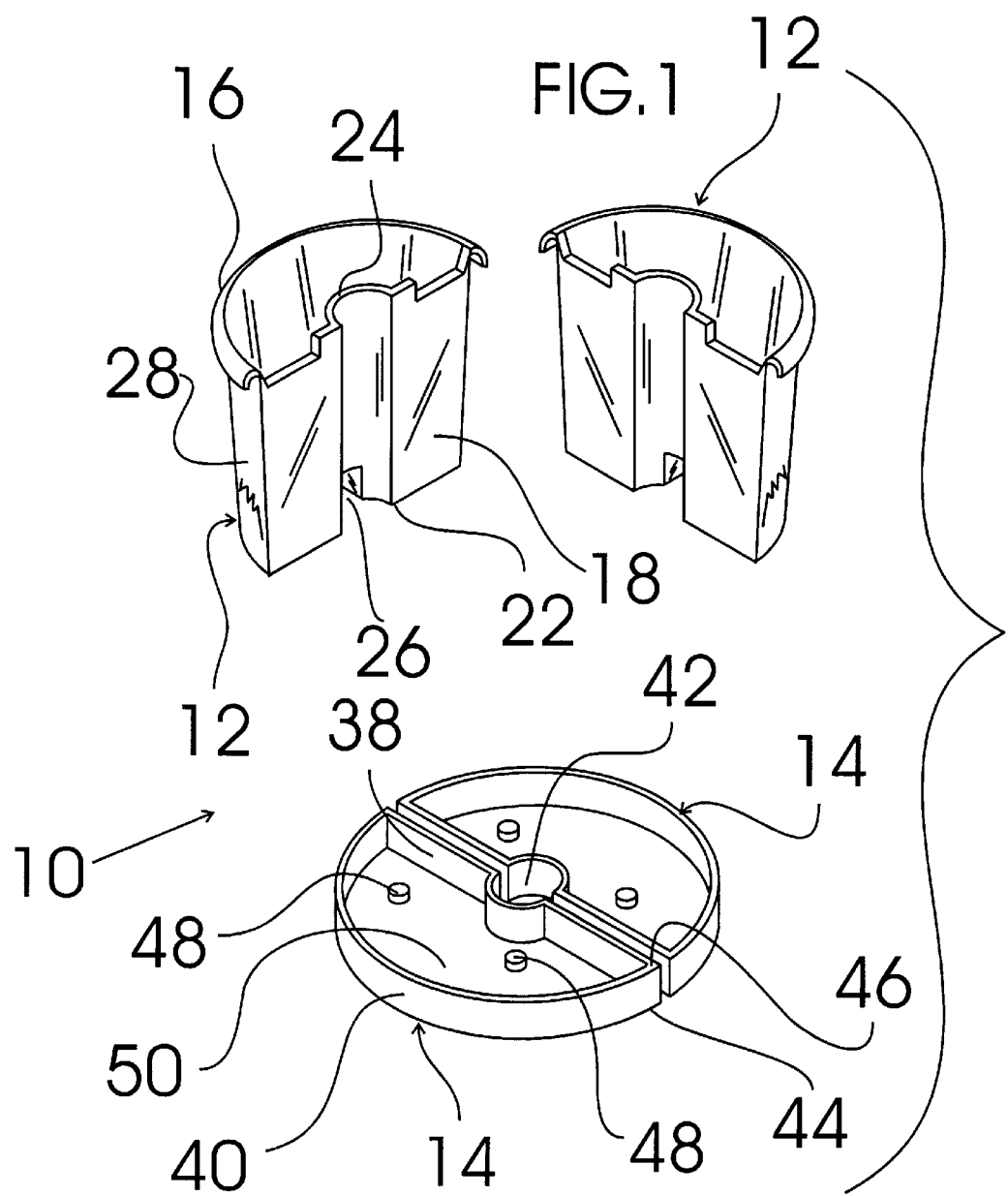
FIG. 1 is a perspective view of an exemplary embodiment of the flower pot system of the present invention showing the two identical half-cylinder pot members each including a curved wall, a planar wall, an umbrella pole channel formed into a mid-portion of the planar wall and oriented from the pot bottom to the pot top and a drip tray edge passage channel formed into the pot bottom and in connection between the umbrella pole channel and an exterior surface of the curved wall, the drip tray edge passage channel being oriented perpendicular to the umbrella pole channel, the pot bottom having a number of drain holes formed therethrough on either side of the drip tray passage channel; and the two identical drip trays each being half-circular in shape and having a planar contact edge, a curved perimeter edge, and a drip tray umbrella channel formed into a mid portion of the planar contact edge and extending from a tray bottom to a tray top; the drip tray umbrella channel, the planar contact edge and the curved perimeter edge being sized and oriented such that when one half of the planar contact edge is positioned through the drip tray edge passage channel the drip tray umbrella channel is concentrically aligned with the umbrella pole channel and one half of the curved perimeter edge is adjacent to one-half of the curved wall.
Figure 2:
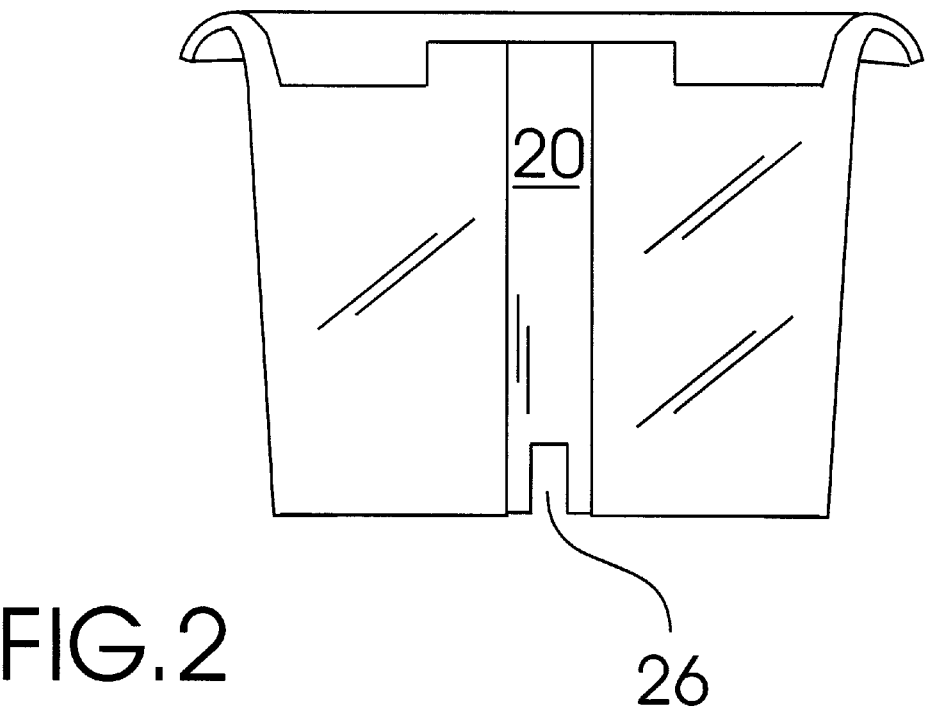
FIG. 2 is a plan view of the planar wall of one of the two identical half-cylinder pot members of FIG. 1 showing the umbrella pole channel formed into the mid-portion of the planar wall and extending from the pot bottom to the pot top and the inner opening of the drip tray edge passage channel.
Figure 3:
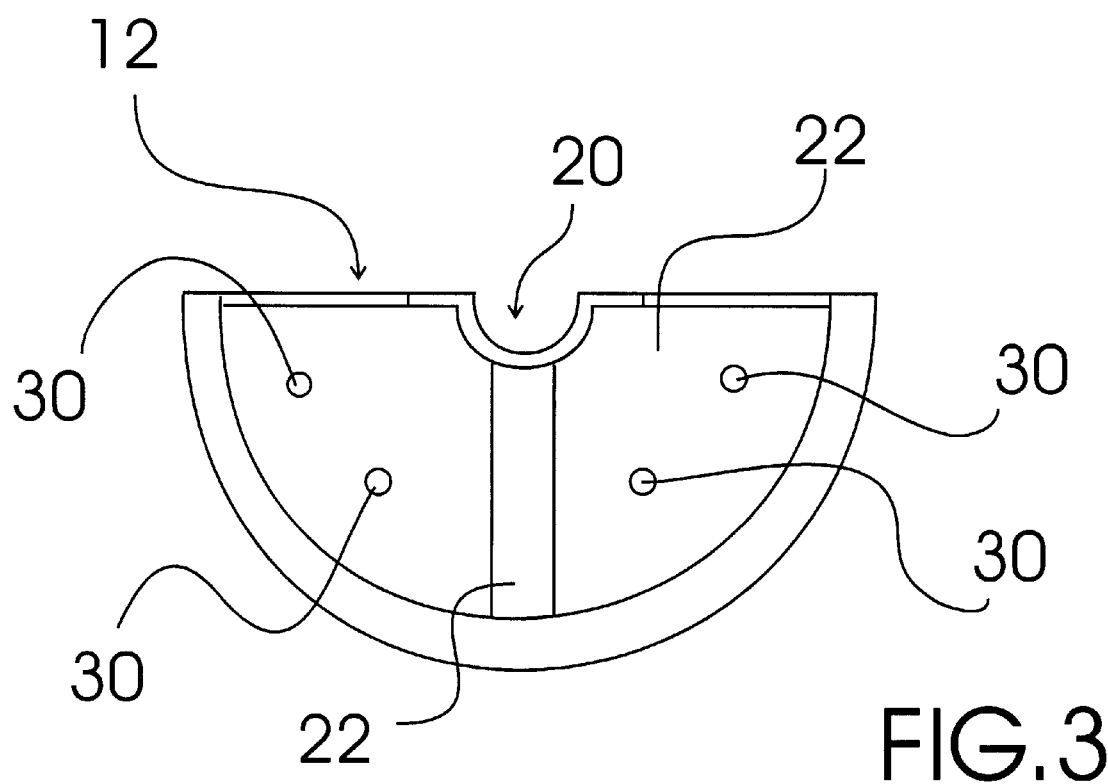
FIG. 3 is a top plan view of one of the two identical half-cylinder pot members showing the interior pot bottom with two drain holes formed therethrough on either side of the raised center surface surrounding the drip tray passage channel.

FIG. 1 shows an exemplary embodiment of the flower pot system of the present invention generally designated 10. Flower pot system 10 includes two identical half-cylinder pot members, each generally designated 12, and two identical drip trays, each generally designated 14. Each half-cylinder pot member 12 includes a curved wall 16, a planar wall 18, an umbrella pole channel 20 formed into a mid-portion of planar wall 18 and oriented from pot bottom 22 to a pot top 24, and a drip tray edge passage channel 26 formed into pot bottom 22 and in connection between umbrella pole channel 20 and a mid-portion of an exterior surface 28 of curved wall 16. Referring to FIG. 2, drip tray edge passage channel 26 is oriented perpendicular to umbrella pole channel. Referring to FIG. 3, pot bottom 22 of half-cylinder pot member 12 has two drain holes 30 formed therethrough on either side of a raised area 32 surrounding drip tray passage channel 26 (FIG. 1 and 2).

Figure 4:
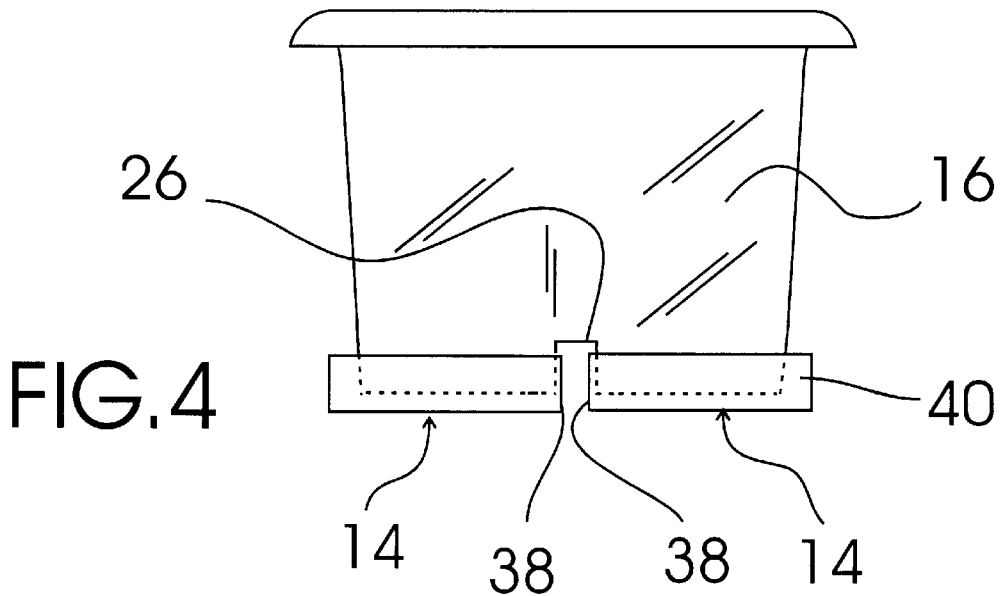
FIG. 4 is a side plan view of one of the two identical half-cylinder pot members and the two identical drip trays positioned with the planar contact edges thereof positioned adjacent to each other and positioned through the drip tray edge passage channel of the half-cylinder pot member.

Referring back to FIG. 1, each of the two identical drip trays 14 is half-circular in shape and has a planar contact edge 38, a curved perimeter edge 40, and a drip tray umbrella channel 42 formed into a mid portion of planar contact edge 38 and extending from a tray bottom 44 to a tray top 46. Two pot supports 48 extend upwardly from an interior surface of tray bottom 44 to allow water to drain from drain holes 30. Drip tray umbrella channel 42, planar contact edge 38 and curved perimeter edge 40 are sized and oriented such that, referring now to FIG. 4, when one half of planar contact edge :38 is positioned through drip tray edge passage channel 26 drip tray umbrella channel 42 (FIG. 1) is concentrically aligned with umbrella pole channel 20 (FIG. 1) and one half of curved perimeter edge 40 of each drip tray 14 is adjacent to one-half of curved wall 16.

Figure 5:
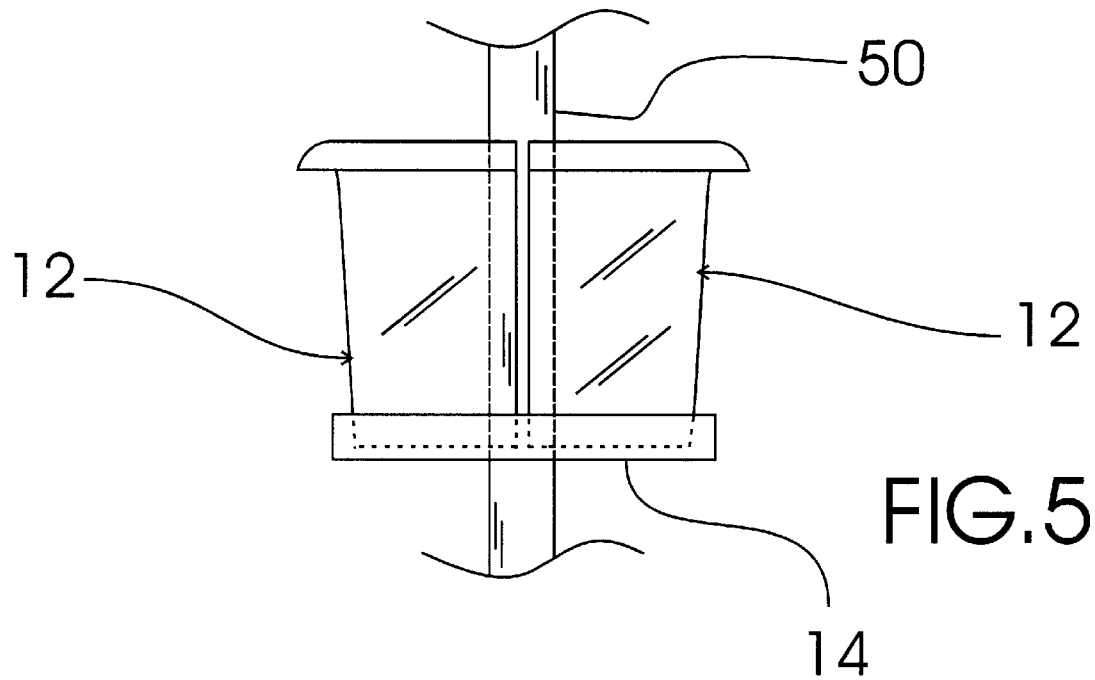
FIG. 5 is a plan view showing the planar walls of the two identical half-cylinder pot members positioned adjacent to each other; one half of each of the half-cylinder pot members being positioned within one of the drip trays; and a representative umbrella pole positioned through the concentrically aligned drip tray umbrella channels and umbrella pole channels.
Figure 6:
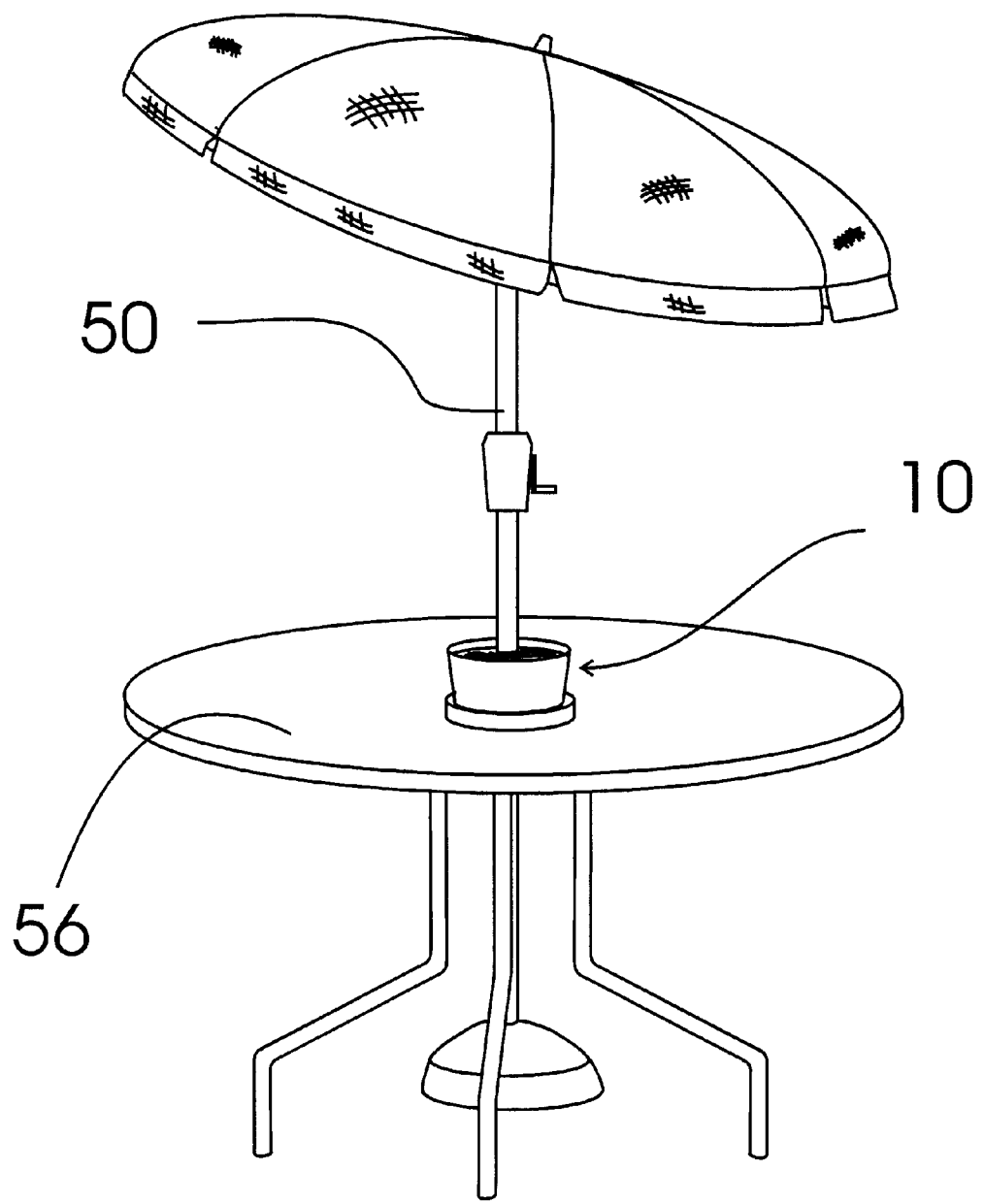
FIG. 6 is a perspective view showing the exemplary flower pot system in use with a representative umbrella pole and patio table.

Referring to FIG. 5, in use the planar contact edges 38 (FIG. 1) of the two drip trays 14 are positioned adjacent to each other with the umbrella pole 50 positioned within a passageway formed by the drip tray umbrella channels 42 (FIG. 1) and the drip tray edge passage channel 26 (FIG. 4) positioned over half of each of the two facing planar contact edges 38 (FIG. 4) of each drip tray 14. Drip trays 14 lock half-cylinder pot members 12 together and provide a fluid transfer mechanism therebetween. Referring to FIG. 6, in use, flower pot system 10 appears like a single flower pot positioned at the center of a patio table 56 that has umbrella pole 50 extending upward from the center thereof.

It can be seen from the preceding description that a flower pot system has been provided that includes a flower pot system that includes a passageway through which an umbrella pole is positionable; that is installable and removable from around an umbrella pole without lifting the umbrella pole from the patio table; and that includes two half-cylinder pot members and two drip trays; each half-cylinder pot member including a curved wall, a planar wall, an umbrella pole channel formed into a mid-portion of the planar wall and oriented from the pot bottom to the pot top and a drip tray edge passage channel formed into the pot bottom and in connection between the umbrella pole channel and an exterior surface of the curved wall, the drip tray edge passage channel being oriented perpendicular to the umbrella pole channel, the pot bottom having a number of drain holes formed therethrough on either side of the drip tray passage channel; each drip tray being half-circular in shape and having a planar contact edge, a curved perimeter edge, and a drip tray umbrella channel formed into a mid portion of the planar contact edge and extending from a tray bottom to a tray top; the drip tray umbrella channel, the planar contact edge and the curved perimeter edge being sized and oriented such that when one half off the planar contact edge is positioned through the drip tray edge passage channel the drip tray umbrella channel is concentrically aligned with the umbrella pole channel and one half of the curved perimeter edge is adjacent to one-half of the curved wall.

It is noted that the embodiment of the flower pot system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A flower pot system comprising:
    two half-cylinder pot members; and
    two drip trays,
    each half-cylinder pot member including a curved wall, a planar wall, an umbrella pole channel formed into a mid-portion of said planar wall and oriented from said pot bottom to said pot top and a drip tray edge passage channel formed into said pot bottom and in connection between said umbrella pole channel and an exterior surface of said curved wall, said drip tray edge passage channel being oriented perpendicular to said umbrella pole channel, said pot bottom having a number of drain holes formed therethrough on either side of said drip tray passage channel;
    each drip tray being half-circular in shape and having a planar contact edge, a curved perimeter edge, and a drip tray umbrella channel formed into a mid portion of said planar contact edge and extending from a tray bottom to a tray top;
    said drip tray umbrella channel, said planar contact edge and said curved perimeter edge being sized and oriented such that when one half of said planar contact edge is positioned through said drip tray edge passage channel said drip tray umbrella channel is concentrically aligned with said umbrella pole channel and one half of said curved perimeter edge is adjacent to one-half of said curved wall.

* * * * *